United States Patent [19]
Pedersen

[11] Patent Number: 6,095,101
[45] Date of Patent: Aug. 1, 2000

[54] INTERNAL COMBUSTION ENGINE OF THE DIESEL TYPE FOR COMBUSTION OF GAS, AND A METHOD OF SUPPLYING SUCH AN ENGINE WITH FUEL

[75] Inventor: Peter Sunn Pedersen, Havdrup, Denmark

[73] Assignee: Man B&W Diesel A/S, Copenhagen, Denmark

[21] Appl. No.: 09/013,204

[22] Filed: Jan. 26, 1998

Related U.S. Application Data

[60] Provisional application No. 60/038,237, Feb. 19, 1997.

[30] Foreign Application Priority Data

Jan. 29, 1997 [DK] Denmark ................. 0105/97

[51] Int. Cl.⁷ ........................................ F02B 3/00
[52] U.S. Cl. ......................... 123/27 GE; 123/5.25
[58] Field of Search ............... 123/27 GE, 595, 123/525, 526

[56] References Cited

U.S. PATENT DOCUMENTS

| | | | |
|---|---|---|---|
| 4,386,594 | 6/1983 | Szloboda | 123/27 GE |
| 4,513,727 | 4/1985 | Lagano et al. | 123/27 GE |
| 4,596,211 | 6/1986 | Szloboda | 123/27 GE |
| 5,136,986 | 8/1992 | Jensen | 123/27 GE |
| 5,243,932 | 9/1993 | Herrmann | 123/27 GE |
| 5,370,097 | 12/1994 | Davis | 123/27 GE |
| 5,522,368 | 6/1996 | Tusino | 123/27 GE |
| 5,711,270 | 1/1998 | Pedesen | 123/304 |

FOREIGN PATENT DOCUMENTS

| | | |
|---|---|---|
| 153240 | 6/1988 | Denmark . |
| 155757 | 5/1989 | Denmark . |
| 0 049 721 B1 | 4/1982 | European Pat. Off. . |
| 0 069 717 A1 | 1/1983 | European Pat. Off. . |
| 0 102 119 B1 | 3/1984 | European Pat. Off. . |
| 0 133 777 A2 | 3/1985 | European Pat. Off. . |
| 0 293 832 A3 | 12/1988 | European Pat. Off. . |
| 34 10 714 C2 | 1/1987 | Germany . |
| 1526725 A1 | 1/1987 | U.S.S.R. . |
| WO 95/24551 | 9/1995 | WIPO . |

OTHER PUBLICATIONS

"Large Diesel Engines Using High Pressure Gas Injection Technology" by MAN B&W Diesel A/S, Apr. 1991.

"Development of the World's First Large–Bore Gas–Injection Engine", Paper D51, 21st CIMAC, Interlaken 1995.

*Primary Examiner*—John Kwon
*Attorney, Agent, or Firm*—Sughrue, Mion, Zinn, Macpeak & Seas, PLLC

[57] ABSTRACT

An internal combustion engine of the Diesel type has an injection system with injectors which at high pressure injects compressed liquid gas into the combustion chambers of the cylinders. The liquid gas may be produced from volatile organic compounds evaporated from crude oil tanks. The engine can be a high-compression engine with a compression ration of at least 1:14, and the liquid gas can have a methane number of less than 10.

22 Claims, 5 Drawing Sheets

INTERNAL COMBUSTION ENGINE OF THE DIESEL TYPE FOR COMBUSTION OF GAS, AND A METHOD OF SUPPLYING SUCH AN ENGINE WITH FUEL

CROSS-REFERENCE TO RELATED APPLICATIONS

The present application claims the benefit of priority from Danish patent application No. 0105/97 filed on Jan. 29, 1997 and from U.S. provisional patent application No. 60/038,237 filed on Feb. 19, 1997 under 37 CFR 1.53(b)(2).

BACKGROUND OF THE INVENTION

The present invention relates to an internal combustion engine of the Diesel type for combustion of gas which is compressed to a high pressure suitable for supply to the engine, which engine has an injection system with injectors that inject liquid fuel into the combustion chambers of the cylinders at a high pressure.

Dual-fuel two-stroke crosshead engines of this type are known in which liquid fuel is injected in the form of fuel oil, typically acting as an ignition aid for the injected gas. The gas in the known engines with high-pressure injection is natural gas which is gaseous at its injection into the combustion chamber. An engine of this type is described, for example, in the Applicant's brochure "Large Diesel Engines Using High Pressure Gas Injection Technology" from 1991 and in the technical article "Development of the World's First Large-Bore Gas-Injection Engine" by T. Fukuda, P. Sunn Pedersen et al, paper D51, CIMAC 1995 at Interlaken, CH. In these engines, the natural gas is supplied via a pipe system supplying a well-defined gas quality, normally methane gas. The high-pressure injection of the gaseous natural gas provides the advantage that the engine can use different compositions of the natural gas. Thus the gas may be of pure methane or, for example, of methane and ethane, if they were fractionated together.

Engines of the Diesel type with supply of gas-based fuel are further known in a number of different designs, all with the common feature that the gas is injected or supplied at a low pressure of, for example, about 1–5 bar into the intake air of the engine and thus replaces part of the fuel oil, which may have environmental advantages in the form of lower particulate emissions in the exhaust gas. For examples of such engines, reference can be made to EP-A 0049721, which mentions supply of LPG (propane/butane) to the intake air, EP-A 0102119, which mentions supply of LPG or methane, and EP-A 0133777, in which compressed natural gas or LPG is added to the intake air. In the cases where the gas is supplied to the engine as a liquid fuel, both evaporation and mixing of the gas with the intake air take place before introduction into the cylinder, while in cases of supply of gaseous gas only mixing takes place.

The proportion of the gas out of the aggregate volume of fuel must not become too large when the gas is mixed with the intake air in an engine of the Diesel type because otherwise auto-ignition of the gas may occur during the compression stroke. It has been described as important in the known art that gas ignition can only take place in a controlled manner by means of fuel oil injection. The injection of oil can be controlled in the usual manner with a suitably accurate timing for achieving the desired operating characteristics of the engine.

In the known engines, which, as mentioned above, may use high-pressure injection of gaseous gas directly into the combustion chamber or may use supply of gaseous or liquid gas to the intake air of the engine, it is a condition for gas operation that the gas is refined or in another manner has obtained a predetermined and stabilised composition with a predictable behaviour as fuel in the Diesel engine so that the actual engine can be adapted to the specific fuel in its structural design. If one of the known engines designed for the supply of gas at a specific ignitability is suddenly supplied with gas which is considerably more ignitable, auto-ignition may occur during the compression stroke with consequent heavy operational disturbances for the engine.

The partial gas operation of the known engines may result in a considerable environmental advantage in as much as the engine combusts less oil which at combustion forms environmentally harmful compounds, which do not occur to the same extent at combustion of gas.

BRIEF SUMMARY OF THE INVENTION

A purpose of the present invention is to provide an engine of the Diesel type which at fuel combustion reduces emission of environmentally harmful compounds substantially more than what can be achieved by reducing the compounds formed at the combustion through combustion of gas instead of oil.

It is another purpose of the present invention to provide an engine of the Diesel type which can be fuelled with any combination of gas fuel whether liquid, gaseous or having varying properties.

It is yet another purpose of the present invention to provide an engine which can reduce the amounts of pollution released to the atmosphere.

It is yet another purpose of the present invention to provide a reliable IC engine with a high degree of safety.

In view of this, the internal combustion engine according to the invention has an injection system which at least includes liquid injectors for high-pressure injection of compressed liquid gas produced from Volatile Organic Compounds evaporated from crude oil tanks.

For some years it has been recognised that the evaporation of Volatile Organic Compounds (VOC) from crude oil, among others, constitutes a serious environmental impact, but despite various attempts to overcome this, and intergovernmental agreements on a reduction thereof, the VOC emission is steadily increasing. The volatile organic compounds evaporating from crude oil have no well-defined composition, but rather vary during a period for oil recovered from a specified oil field and also vary between oils recovered from different fields.

By using the volatile organic compounds as high-pressure injected fuel in an internal combustion engine of the Diesel type VOC emission to the atmosphere is avoided, which results in a considerable environmental benefit, at the same time achieving the effect known per se of the exhaust gasses being purer when gas is combusted instead of oil. An economic advantage is also gained in that purchased refined fuel is at least partially replaced by gas compounds which were formerly thrown away, and which in late years have required payment to get rid of. The use of VOC as fuel in an engine of the Diesel type does, however, mean that the combustion properties of the fuel can vary much within a very short interval of time.

When the crude oil at loading flows over into a tank, the oil splashes down into the tank and is exposed to vigorous movements and circulation, which results in release of relatively large amounts of VOC in the form of evaporated alkanes of a very mixed composition depending on the type of the crude oil. These alkanes typically contain relatively large amounts of each of the compounds methane, ethane, propane and butane in both normal and branched compounds as well as some amounts of higher alkanes $C_5$ and $C_{6+}$. At the subsequent storage in the tank, VOC evaporate with not quite such a spread in the alkanes, as this evaporation is mainly controlled by the partial pressures of the components of the crude oil in the tank space above the oil. The liquid phase of each component will thus seek towards a balance with the associated vapour phase, but at the same time the vapours in the tank space also tend to achieve higher concentrations of the heavier components near the surface of the crude oil, which slows down the evaporation of the higher alkanes. If the crude oil tank is located on a ship, the motions of the ship during bad weather voyages may give rise to such splashing of the crude oil that the gases in the tank space become more evenly distributed, which results in a higher evaporation of the heavy components than when the ship sails in more calm conditions.

Thus both over some days slow variations may occur in the alkane composition of the VOC and over some minutes or hours rapid variations that radically change the ignition properties, etc., of the fuel. These variations render impossible the use of the fuel as a premix addition to the intake air of the internal combustion engine. By using high-pressure injection of the fuel, premature ignition is avoided, and therefore the rapidly varying fuel properties can only affect the speed at which the fuel is combusted.

It is also a substantial advantage that the fuel is liquid at injection into the combustion chamber. Firstly the liquid gas can be compressed to a pressure suitably high for the injection, for example ranging from 200 to 1000 bar, at a substantially lower energy consumption than at compression of gaseous gas. Secondly the liquid gas renders it possible during a short period to inject a gas volume of a large energy content, and the entire injection sequence with variations, if any, in the rate of injection can be controlled by the means known from oil injection. Thirdly, the main part of the aggregate energy content of the VOC evaporated from the crude oil can be liquefied by advantageously simple and energy-economical means, such as by compression to a higher pressure than the condensation limit of the desired alkanes and/or by cooling. Before injection, the condensate then only has to be compressed to the pressure of injection.

The methane and ethane components of the VOC cannot be liquefied in any suitable manner. It is possible to store the methane and ethane gasses temporarily by re-introducing these gases into the crude oil, but this provokes increased evaporation of VOC at a later time, so this is merely a process postponing the problem. The methane and ethane gases can also be vented to the atmosphere such as has been effected previously with all VOC. In all circumstances, combustion of the liquid $C_{3+}$ alkanes will involve a considerable gain compared with former times.

In one embodiment the injection system of the internal combustion engine includes secondary injectors for high-pressure injection of gaseous mixtures which at least partially contain gas evaporated from crude oil tanks as well as inert gas, if any, which has been filled into the crude oil tanks as a detonation-preventing gas. The secondary injectors can inject the methane and ethane gases, etc., not liquefied by processing of the evaporated VOC. When emptying crude oil tanks it is normal to add inert gas to the tank to avoid gas explosions in the tank. This inert gas is an oxygen-poor mixture of gases, such as nitrogen or carbon-dioxide and up to about 7 per cent of oxygen. When crude oil is loaded into the tank, the oil will displace the inert gas in step with the loading, but at the same time the released VOC gases will be mixed with the inert gas. The gaseous mixtures fed to the secondary injectors will therefore during and immediately following a tank loading contain large amounts of inert gas which cannot be combusted in the engine. When only the proportion of combustible gases is sufficiently high to have an energy content more than double the compression work required for turning the gaseous mixture into a form suitable for the injection, it can pay to inject the gaseous mixture into the combustion chamber of the engine. Environmentally it will be an advantage to inject the gaseous mixtures into the combustion chamber of the engine, even though the energy content of the combustible gases does not cover the compression work.

Preferably, the injection system includes pilot injectors for injection of ignitable pilot fuel which initiates a combustion process on injection. The pilot fuel may be oil or another very easily ignitable fuel. If the compressed liquid gas is of a quality making ignition aid unnecessary, pilot injectors may be omitted in the cylinders having liquid injectors. Nevertheless, it may be advantageous to arrange at least one pilot injector at each cylinder. If the production of VOC is insufficient to cover the aggregate fuel requirement of the engine over a long period, the engine may at intervals be operated only on oil injected via the pilot injectors.

In one embodiment a number of the liquid injectors and of the secondary injectors are combined in a corresponding number of dual-fuel injectors capable of injecting both the liquid gas and the gaseous gas-containing mixtures. The dual-fuel injector requires less space in the cylinder cover than a liquid injector and a secondary injector and is therefore easier to position, especially if the same cylinder is already provided with injectors for injection of oil.

The reliability of the gas injection can be improved by the injection system at intervals actuating the secondary injector also when no gaseous fuel is to be injected into the associated cylinder. The actuation may, for example, take place at least once every ten minutes, and at actuation the nozzle holes are blown clean of any deposits. If no gas-containing mixture is available at the actuation, compressed air or any gas available, such as inert gas, may be used instead. The interval between each clean-blowing actuation need not be ten minutes, but may range between once per engine cycle and once per day. The interval is selected in consideration of the fuel combusted when no gas is injected. If the fuel gives rise to a heavy formation of particles and soot, a short interval is chosen.

If the engine is provided over a long period with gaseous and liquid gas in certain ratios, it is possible to obtain a simplification of the injection system in that only some of the engine cylinders are provided with secondary injectors, while others of the cylinders are provided with liquid injectors, all the cylinders also optionally having pilot and/or fuel oil injectors. The simplification lies in the fact that three different kinds of fuels are not to be supplied to all the cylinders of the engine. If, for example, the VOC composition is so that only 10–15 per cent of the calorific value of the VOC derives from methane and ethane, one or two of the cylinders of the engine can burn off all the gaseous gas, so there is no need for distribution and injection systems for gaseous fuel to the other cylinders.

Preferably, the engine is the main engine of a ship with crude oil tanks, such as a shuttle tanker or a crude oil carrier, and volatile organic compounds of ignition properties, calorific values and/or evaporated amounts varying over time evaporated from these tanks constitute a substantial proportion of the fuel consumption of the main engine. A very large amount of the VOC today vented to the atmosphere are released on loading of crude oil at offshore oil recovery sites or at coastal oil terminals and during the subsequent voyage to refinery or other unloading location. By using the VOC as fuel in the main engine of the ship, the volatile compounds are removed suitably rapidly after their release from the crude oil.

The engine may have an electronic control unit which, on the basis of monitoring of the current cylinder pressures, controls at least the injection pressure for the gaseous fuel gas. With a continuous monitoring of the pressure sequence of a cylinder, the combustion in the cylinder can be analyzed by the electronic control unit, the energy development at combustion and the speed of combustion can be determined, and on this basis the control unit can define fuel parameters for use in subsequent injection sequences. When the engine is supplied with gaseous gas mixtures collected from crude oil tanks, the gas may contain varying amounts of inert gas. The incombustible inert gas affects the combustion of the combustible VOC so that the combustion speed is higher when the inert gas content is higher. To achieve a more homogeneous combustion the control unit preferably adjusts the injection pressure in a downward direction when the inert gas content of the gas is high. This also provides the advantage that the compression work for high-pressure compression of the gas is reduced.

The invention further relates to a method of fuel supply of an internal combustion engine of the above type, which method is characterized in that volatile organic compounds evaporated from crude oil tanks after optional temporary storage and compression are supplied to the fuel system of the engine and used as fuel in the engine regardless of the fact that these organic compounds have ignition properties, calorific values and/or evaporated amounts varying over time. The method achieves the above advantages that the environment is spared venting of at least part of the VOC and at the same time the engine uses a more pure fuel than oil, and the shipowner achieves an economic benefit from using a waste product as fuel instead of purchased bunker oil.

In an environmentally optimal further development of the method, the evaporated and compressed compounds comprise both a gaseous and a liquid phase being substantially separated from each other at the supply to the engine. By using both the liquid and the gaseous phase as fuel, largely all the evaporated amount of VOC can be burnt. For the engine it is essential that the two phases are kept mutually separated at the supply to the engine, because unsuitably large variations in the calorific value of the fuel supplied for a combustion would occur if during injection of, for example, a gas phase, a drop of liquid phase suddenly came through the same injector.

With a view to avoiding separation of liquid phase in the gas phase the temperature of the gaseous phase in the fuel and injection system of the engine is preferably kept higher than the temperature of the gaseous phase after compression to the pressure at which it was supplied to the fuel system of the engine. In an advantageous embodiment the temperature of the gaseous phase in the fuel system is controlled so as to rise towards the engine so that any risk of condensation is eliminated. As an alternative to this, at the inlet for gaseous phase to the fuel system of the engine there may be a freeze trap for separation of condensate from the gas phase.

Preferably said liquid and said gaseous phases are both supplied to all the cylinders of the engine, the injectors for the gas phase thus being kept operable on all cylinders, just as the cylinders can be uniformly controlled.

When the engine is the main engine of a ship with crude oil tanks from which evaporation of volatile organic components occurs, the engine is preferably only supplied with fuel oil to the extent required as ignition aid or required because the current fuel requirement of the engine exceeds the supply of fuel gas to the engine. This provides the optimum saving on bunkered fuel oil. Control of supply of fuel gas to the engine need not be dictated by the fuel requirement of the engine or by the current VOC production, but may very well be subject to an overall control aiming, as far as possible, to combust the environmentally friendly fuel gas in the coastal areas where it is desired to avoid environmentally harmful emission products. The supply of the gaseous and the liquid fuel gas may also be controlled individually, for example so that the gaseous fuel gas is supplied to the engine in step with the production thereof to avoid storage, while the liquid fuel gas is stored provisionally as needed in the ship and is supplied at the times when the environmental benefit is greatest.

The engine may be connected with a shaft generator in a shuttle tanker or in a vessel for collection of hydrocarbons from a drilling or production well, and in this case at least part of the volatile organic compounds evaporated at the oil loading are preferably combusted in the engine driving the shaft generator for power production for driving units in the dynamic positioning system of the tanker or vessel. As the greatest amount of VOC is formed at loading of the crude oil, it is especially advantageous to provide the engine with a shaft generator of a dimension so that the power requirement for bow propellers, etc., used in the dynamic positioning of the vessel can be covered by the shaft generator, and then to operate the main engine by VOC during loading.

The invention further relates to an internal combustion engine of the Diesel type for combustion of gas compressed to a high pressure suitable for injection into the engine cylinders of 200 bar, which engine is supercharged to a charging pressure of at least 3 bar absolute and has a volumetric compression ratio of at least 1:14 and a mean effective pressure of at least 15 bar and has an injection system with injectors injecting liquid fuel into the combustion chambers of the cylinders at a high pressure.

Such an engine is known from the Applicant's above brochure "Large Diesel Engines . . . .", where the liquid fuel is pilot oil, and the gas is gaseous natural gas precompressed to a supply pressure of about 250 bar before supply to the engine. The gas is injected at this pressure after control oil has opened the injector. The natural gas used mainly consists of methane.

Prior art also discloses old four-stroke engines where LPG has been used as fuel, see for example the above publications where LPG is evaporated in the intake air of the engine. These old engines were relatively small, high-speed engines with compression ratios of maximum 1:13, and it is well-known that the requirement to a suitably high methane number heavily increases with the compression ratio of the engine, its cylinder diameter, its mean pressure and with lower speeds.

The methane number is an expression of the ignition properties of the gas, approximately like the octane number for petrol, and a gas with a methane number of 100 auto-ignites like pure methane, while a gas with a methane number of 0 auto-ignites like pure hydrogen. The ignition properties are important to achieve good utilisation of the calorific value of the fuel. It is not desirable that the ignition is a detonation, as this results in a steep pressure increase and a very high combustion pressure, usually leading to damage on the combustion chamber components with a risk of complete breakdown of the engine.

Normally it is therefore desirable with a gas with a high methane number. Ordinary prevalent natural gas has a methane number of about 90 when the gas is pure, and when admixed with carbon-dioxide or nitrogen the methane number may vary between 90 and 130, i.e., the methane number can be higher, which is perceived by the engine as a positive variation. The high volumetric compression ratio of at least 1:14 in combination with the high mean effective pressures of at least 16 bar in the more recent Diesel engines leads to a presumption that gas operation at full load is only possible on gaseous natural gas having a methane number of at least 80. The high compression ratio involves the disadvantage that the natural gas has to be high-pressure compressed to be able to be injected at a suitable high pressure into the combustion chamber at the end of the compression stroke, which requires a noticeable energy consumption of about 5 per cent of the shaft power of the engine for the gas compressors.

With a view to reducing the energy consumption for high-pressure compression of the gas, the engine according to the invention is characterized in that the injection system includes at least liquid injectors for high-pressure injection of compressed liquid gas.

It is a condition for injecting liquid gas that the gas includes propane, butane and/or $C_{5+}$ hydrocarbons. Pure propane has a methane number of 35, butane a methane number of only 10, and the higher hydrocarbons have substantially lower methane numbers. When, despite the expectation to the contrary, it is nevertheless possible to combust liquid gas with such low methane numbers in a controlled manner in a high-compression supercharged engine, this is probably due to the fact that combustion of the gas requires a certain oxygen content. The injected gas evaporates immediately upon injection, but even though the temperature in the combustion chamber is very high, the gas cannot combust until it has been suitably mixed with the air in the combustion chamber. The crucial step for the combustion is thus the mixing, and not the methane number itself as has been presumed so far.

The liquid gas can be compressed to very high pressures at a very small energy consumption. The compression may either take place independently of the injection itself in a form of a common rail system where the injectors are controlled by control oil, or the compression may be carried out by piston pumps in the same manner as is done conventionally with fuel oil for Diesel engines, viz., the piston of the pump is actuated and pressurizes the liquid gas when injection is to take place. In the latter case the gas injector is opened by the pressure increase in the liquid gas, for which reason control oil can be omitted.

BRIEF DESCRIPTION OF THE SEVERAL VIEWS OF THE DRAWING

Examples of the invention will now be explained below in further detail with reference to the very schematical drawings, in which.

DETAILED DESCRIPTION OF THE INVENTION

High-pressure gas injection engines of the Diesel type and with supercharging may be four-stroke engines of the medium-speed type or be large two-stroke crosshead engines, which with the engines of today of the Applicant's type MC-GI may have an output per cylinder ranging from 250 to 5800 kW at speeds ranging from 75 to 250 rpm with a stroke/bore ratio ranging from 2.45 to 4.20, and with volumetric compression ratios of, for example, 1:14, 1:15, 1:16, 1:17, 1:18 or higher. Volumetric compression ratio means the classical compression ratio related to the volumes above the piston when the latter is in its top or bottom dead centre positions.

Figure 1:
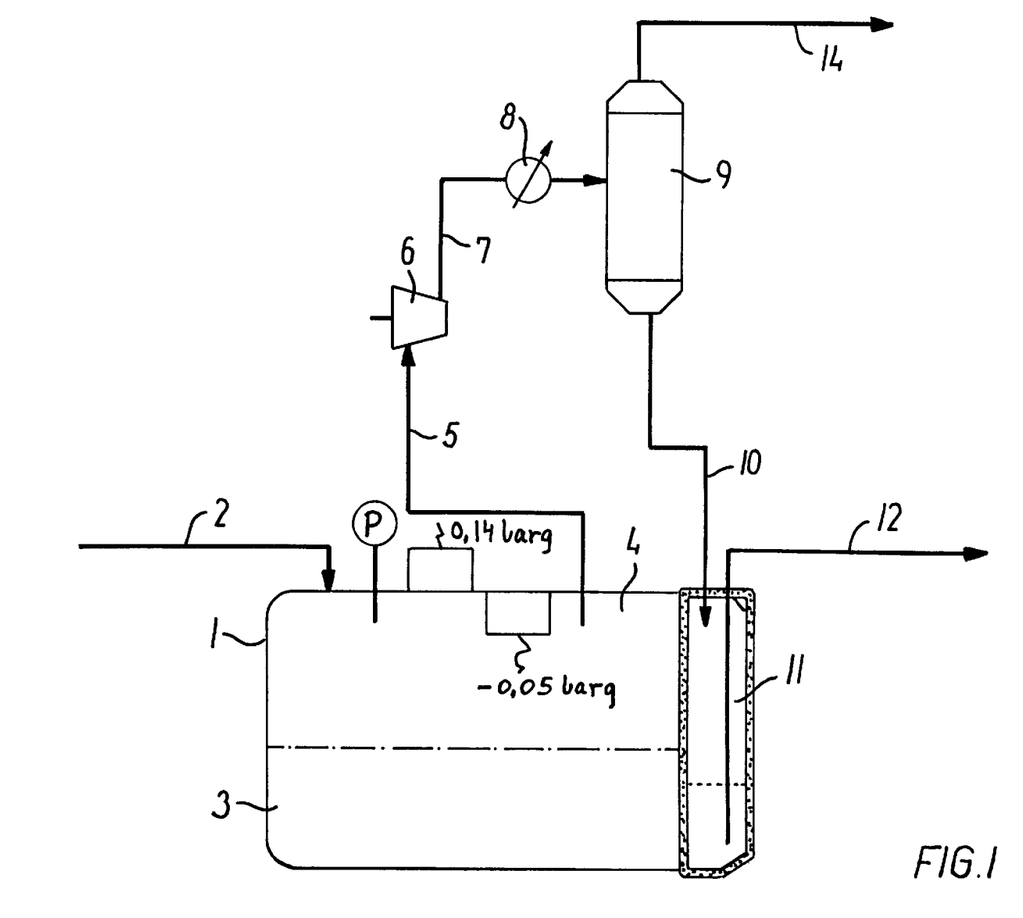
FIG. 1 shows a diagram of a system for capturing VOC from crude oil tanks in a vessel.

FIG. 1 shows a crude oil tank 1 in a ship during loading. The ship may, for example, be a crude oil carrier or a shuttle tanker. Through a tank connection 2, crude oil is supplied from an on-shore terminal plant or from an offshore plant, such as a loading buoy at a production platform or at a Floating Production Storage Offloading (FPSO) vessel. The ship may also be such an FPSO vessel receiving crude oil from a production well on the sea bed.

As the tank is being loaded with crude oil 3, any inert gas in the tank and volatile organic compounds (VOC) 4 evaporated from the crude oil are pressed out through an outlet pipe 5 leading to a compressor 6 which delivers VOC to a condenser 9 via an intermediate pipe 7 with a cooler 8. From the condenser, condensed gas is drawn and passed through a pipe 10 to an insulated tank 11 in which the liquid gas, typically containing propane and higher alkanes, can be provisionally stored at atmospheric pressure and at a temperature of approximately −42° C. When the liquid gas is to be used as fuel, it is passed via a suction pipe 12 to a compressor 13 shown in FIG. 3, which compresses the gas to a supply pressure typically of 400 bar in a common rail system and of 20 bar if the final compression to the injection pressure takes place by means of piston pumps at each cylinder.

Figure 4:
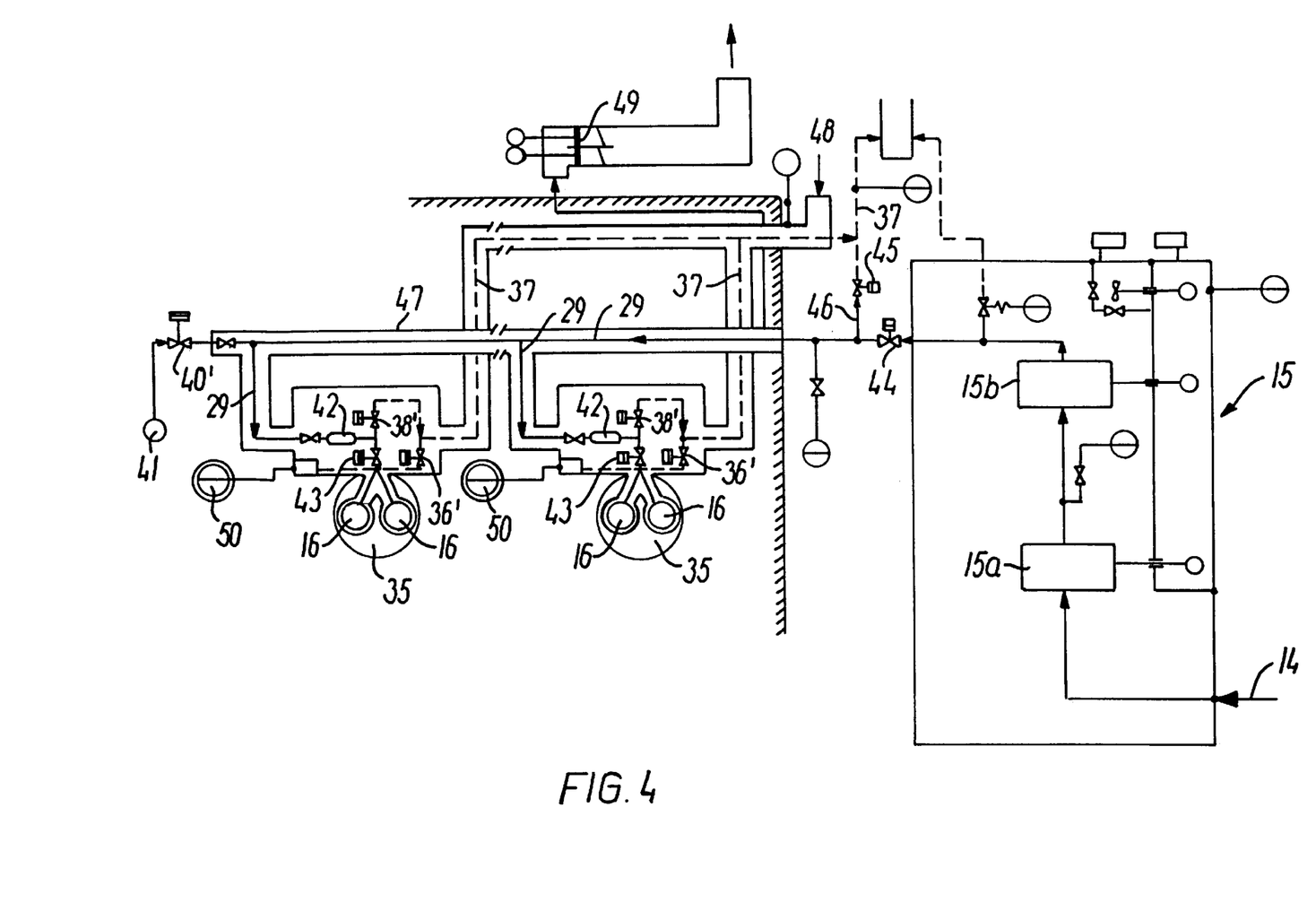
FIG. 4 is a diagram of a fuel part system for gaseous gas for an internal combustion engine.

From the top of the condenser 9, a pipe 14 passes the non-condensed components, methane and ethane, to a multistage compressor 15 shown in FIG. 4, which compresses the gaseous gas phase to an injection pressure typically of about 250 bar, and from this compressor a common rail system distributes the gas to the individual cylinders of the engine.

During the loading of the ship, the condensing system is in continuous operation, but during the subsequent voyage it will be sufficient with intermittent operation of the system controlled on the basis of measurement of the pressure in the tank 1, so that the condensing system is started, for example, when the gases in tank 1 have a high pressure of 0.14 bar, and is stopped when the gases have a low pressure of 0.05 bar. Further details is incorporated by reference to the description in Norwegian patent appl. No. 970393 (corresponding to WO98/33026) of Statoil, Den norske stats oljeselskab a.s., filed on the same day as the above said Danish priority application.

Figure 2:
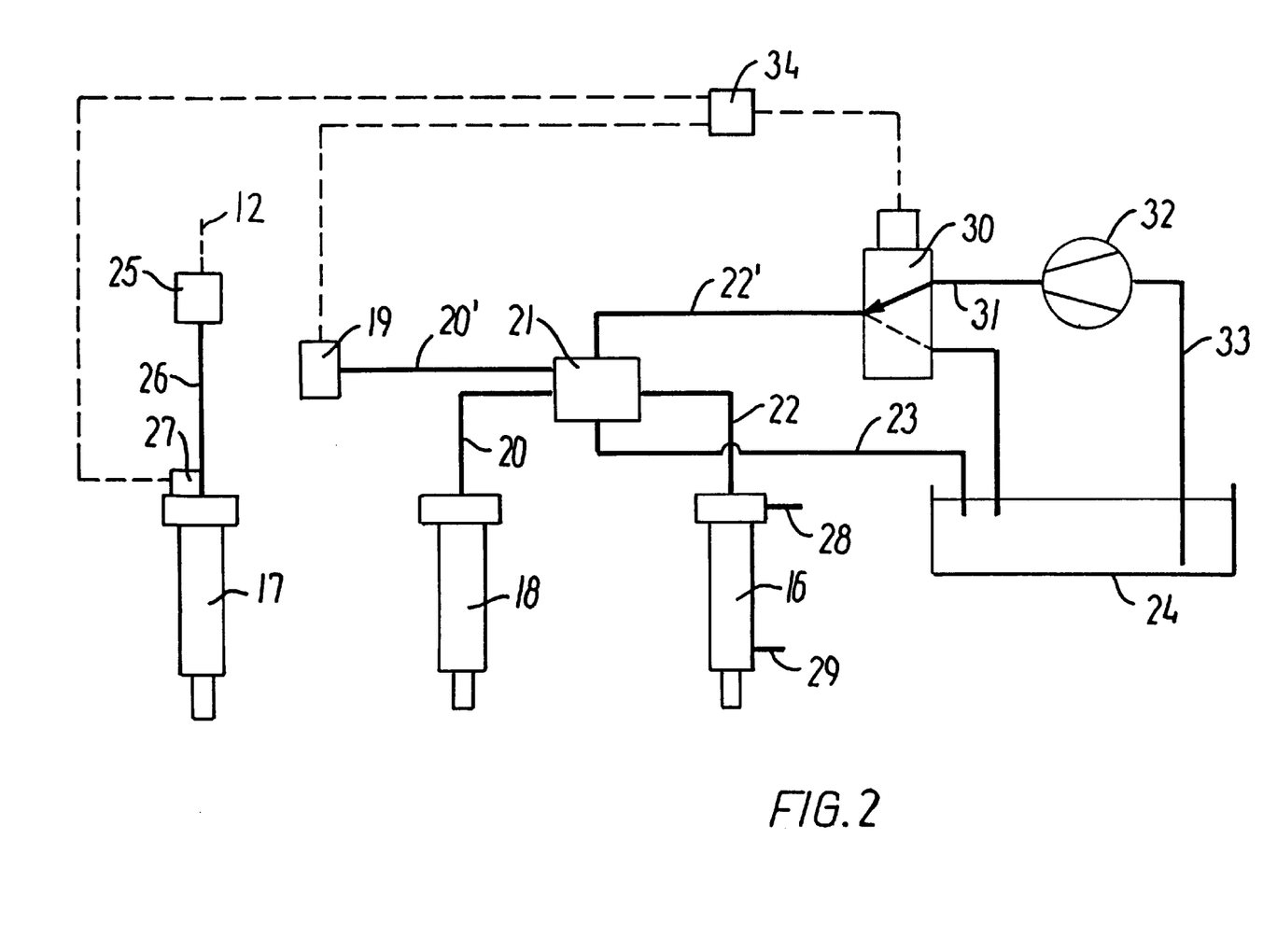
FIG. 2 is a diagram of an injection system for gas and liquid gas, and fuel oil, respectively, for a combustion engine of an oil carrier.

FIG. 2 shows an embodiment of an injection system for a single engine cylinder having a secondary injector 16 for injection of gaseous gas and a liquid injector 17 for injection of liquid gas and a pilot injector 18 for injection of oil. The three injectors may be separately mounted in respective housings in the associated cylinder cover. It is also possible to integrate two of the injectors in a common housing into a so-called dual-fuel injector. Although the pilot injector can naturally form part of such a dual-fuel injector, it is preferred in the cases where all three types of injectors are found in a single cylinder that the secondary injector 16 and the liquid injector 17 are integrated into the dual-fuel injector 105 (FIG. 5), the gases thus being passed to the same injector housing, which facilitates encapsulation of the gas-carrying systems. Dual-fuel injectors are described in detail in, for example, the Applicant's Danish patents 153240 and 155757 and the Applicant's publication WO95/24551 has a detailed description of a gaseous gas injector. Several injectors of each type may be mounted on the same cylinder in order to achieve a better distribution of the fuel in the cylinder, among other things.

The below description discusses injection of the gas whether it is liquid or gaseous. Injection is to mean that the gas is either injected and atomized or blown in, and both actions take place at a suitable high pressure in relation to the current pressure in the combustion chamber.

If the cylinder in question needs fuel oil, either as an ignition aid or because the gases cannot alone cover the fuel requirement, the oil can be supplied at intervals at the desired time in the engine cycle to the pilot injector 18 from a fuel oil source 19, which be of different designs. The fuel oil source may be a usual fuel pump, supplied with oil from a low-pressure feed pipe common to, the pumps and having a pump piston driven by a cam on a camshaft. A regulator, not shown, can turn the pump piston in the usual manner for adjustment of the oil volume supplied from the pump at a high pressure of up to, for example, 800 bar. Alternatively, the fuel oil source may be an electronically actuated fuel pump supplied with oil from a common low-pressure feed pipe and adjusted as to volume and controlled as to time by means of setting signals from an electronic control unit. A third possibility is the so-called common rail system where the fuel oil source comprises a high-pressure reservoir for oil connected to an inlet port of an electronically actuated control valve having further at least two ports, viz., an outlet port to a pipe 20, 20' leading to the oil inlet of the pilot injector 18, and a port connected with a drain. Based on control signals received from an electronic control unit the control valve can switch the pipe 20, 20' to either the oil inlet port or the drain port.

When the fuel oil source 19 starts supply of high-pressure oil to the pipe 20 at the point in time of the engine cycle desired in respect of the timing of the combustion, the pressure will rapidly rise above the opening pressure of the pilot oil injector 18, whereupon the oil is injected.

The liquid fuel gas is supplied from a fuel gas source 25, which may be formed in the same ways as the fuel oil source 19. For the sake of simplicity only the embodiment of the common rail type will be described, according to which the source 25 comprises the low-pressure supply from the tank 11 and the high-pressure compression in the compressor 13, from where a pipe system 26 connects the liquid injectors 17 in the engine in parallel. In response to control signals received from an electronic control unit, a control valve 27 can connect the fuel inlet of the injector 17 with the high-pressure gas pipe 26 or with a drain. When the control valve 27 opens for supply of liquid gas at the point of time of the engine cycle desired in respect of the timing of the combustion, the liquid injection 17 opens for injection and atomization of the gas in the combustion chamber.

The injection of gaseous gas by the injector 16 can only take place when liquid fuel has been injected for the same combustion sequence for initiation of the combustion. This liquid fuel may either be fuel oil from the injector 18 or fuel gas from the injector 17. Below is described an embodiment in which the combustion is initiated with pilot oil, but it should be understood that the liquid injector 17 can replace the pilot injector 18 in the safety system described.

When the pilot injector 18 opens, the oil pressure at the same time actuates a safety device 21 to enable application of control oil pressure on the secondary injector 16. The safety device 21 may, for example, be of a well-known mechanical type with a piston keeping a drain port in a control oil pipe 22, 22' open until the fuel oil pressure displaces the piston for closure of the drain port by exceeding said opening pressure. Through a pipe 23, the drain port is connected with a reservoir 24 for control oil. Alternatively, the safety device may be of an electronic type which determines in an electronic control unit whether the fuel oil or the liquid fuel gas is injected and uses this information as a condition for actuation of the secondary injector 16. In this case the control unit can detect the injection on the basis of a pressure sensor in the pipe 20 or by a position sensor in the valve 18 for detecting the actual valve opening.

In the embodiment shown the secondary injector 16 can be actuated to an open position by application of control oil pressure at the connection of the gas valve to the pipe 22, 22'. The injector may further have a connection 28 for sealing oil and a connection 29 leading to a high-pressure gas source. The sealing oil pressure may, for example, be 40 bar higher than the gas pressure in the connection 29. Alternatively the injector 16 may be kept closed by the control oil pressure and be opened by its elimination, thus obviating the need for sealing oil. This is described in detail in WO95/24551.

An electronically actuated control valve 30 has an inlet port connected with a pipe 31 with high-pressure oil supplied from a pump 32 which is fed from the reservoir 24 via a pipe 33. The control valve 30 has further at least two ports, viz., an outlet port to the pipe 22, 22' and a drain port connected with the reservoir 24. Based on control signals received from an electronic control unit 34, the control valve can connect the pipe 22, 22' to either the oil pressure pipe 31 or to the drain port. The control valve may, for example, be a magnetic valve, an electronically controlled hydraulic valve or a magnetic valve with so-called magnetic locking, which may result in extremely short switch times.

In a well-known manner the electronic control unit 34 is supplied with information on the current angular position of the engine crankshaft and controls the three injectors 16–18 for injection of the most desirable combination of fuels for the combustion in question.

Figure 3:
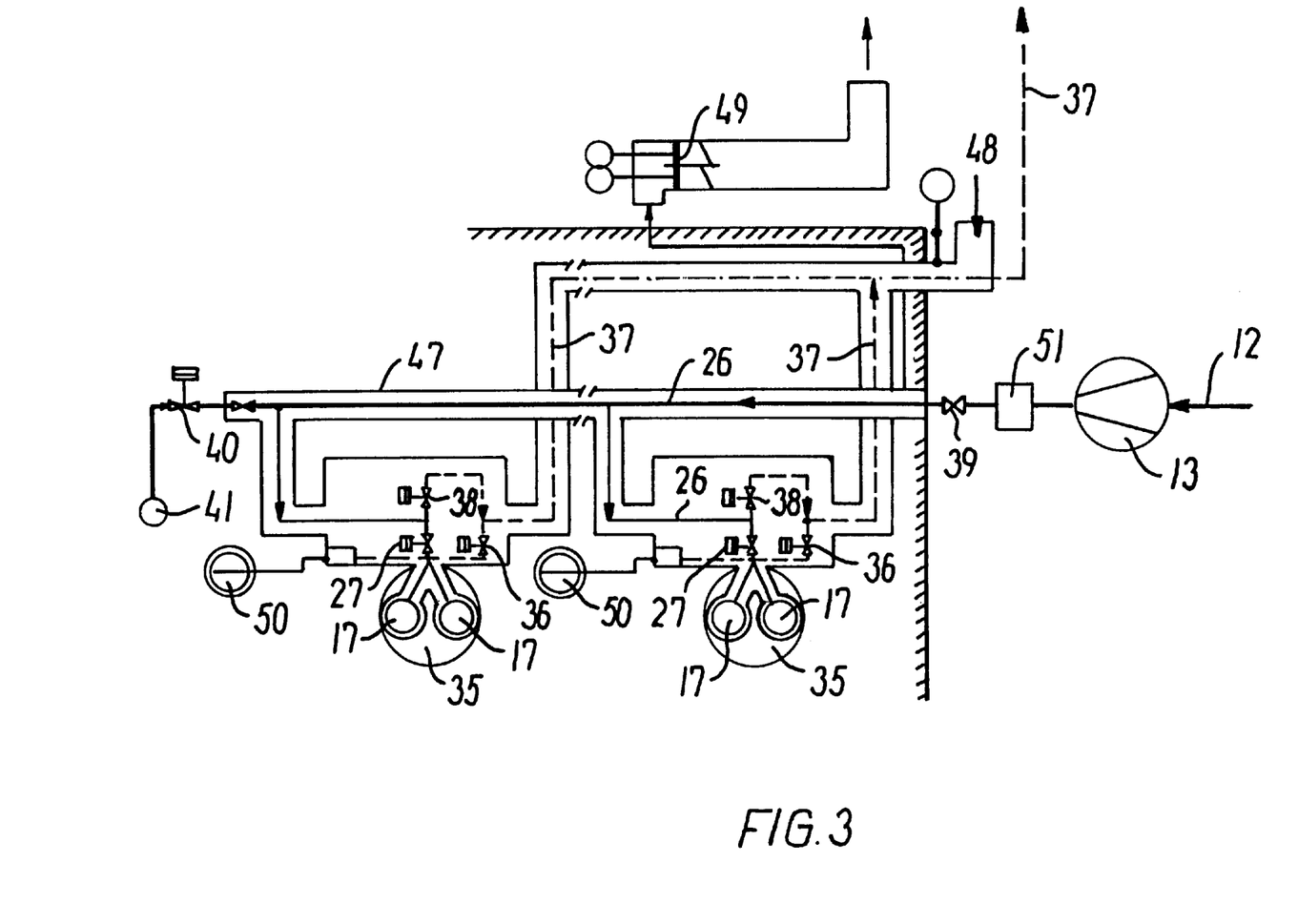
FIG. 3 is a diagram of a fuel part system for liquid gas for an internal combustion engine.

An example of the gas systems in a crude oil carrier with a propulsion engine according to the invention will now be described in further detail with reference to FIG. 3 showing the system for the liquid gas, and FIG. 4 with the system for the gaseous gas. The drawing only shows two cylinders 35, but of course the engine has more. Blow-off valves 36, 36' can empty the gas systems of the cylinder of gas through a common drain pipe 37, if necessary. A venting valve 38 can empty the branch pipe 26 if the engine is not to be driven on liquid gas for a period. The entire feed pipe 26 can be emptied of liquid gas by closure of a main valve 39 and opening of the drain valves, and of a feed valve 40 connected with an inert gas source 41. In a completely corresponding manner, a venting valve 38' (FIG. 4) can empty a high-pressure gas reservoir 42, the volume of which may contain gaseous gas for, for example, 20 injection sequences, and a cut-off valve 43 can close the gas supply if the pressure lowering at an injection is so large that the secondary injector must be presumed not to be correctly closed after conclusion of the injection. The entire pipe 29 can be scavenged with inert gas by closure of a main valve 44 and opening of a cut-off valve 45 in a drain pipe 46 simultaneously with opening of the valve 401 to the inert gas source 41.

The gas-carrying members in the engine room are encapsulated by a mantle 47 supplied with venting air at the outlet of the drain pipe 37, as shown by the arrow 48, at least one blower 49 exhausting air from the mantle 47 at the passage of the feed pipe into the engine room. Gas detectors 50 are arranged at suitable locations in the system for monitoring any gas leakages.

Before being passed into the engine room, the liquid gas may be heated to, for example, 45° C. in a unit 51 to avoid any ice formations inside the mantles 47.

The gaseous gas supplied with the pipe 14 is compressed in the compressor generally designated 15, at least in a low-pressure compressor 15*a* which compresses the gas to about 25 bar, and in a high-pressure compressor 15*b* which delivers the gas at a pressure of, for example, 250 bar to the pipe 29 which has been passed into the engine room. The drive motors for the compressor are placed in a gastight enclosure, and both the latter and the compressor room are vented by respective blowers.

The output pressure from the high-pressure compressor 15*b* can vary with the composition of the gaseous mixture being compressed. The pressure may be lower, such as 175 bar, when the inert gas content is high, and higher when the gas mixture consists mainly of combustible gas. It has been mentioned above that the pressure can be controlled by means of the electronic control unit of the engine based on pressure measurements from combustion sequences and pertaining calculation of the energy development at combustion, which, by comparison with the duration of the injection, provides a measure of the inert gas content of the gas mixture. Thus, in a feed-back control, data for a combustion can be used regularly for adjustment of the output pressure of the high-pressure compressor for the subsequent engine operation. It will often be so that a ship with crude oil tanks sails between fixed destinations and loads crude oil of a uniform quality into the crude oil tanks. This renders it possible to record at the first loading how the inert gas content of the gas mixture varies during and after the tank loading. These data can then be used at subsequent loadings as an empirical basis for adjustment of the output pressure of the compressor in a feed-forward control.

When the engine is a high-compression Diesel engine, liquid gas can also be supplied in the form of LPG or an LPG mixture which can be refined, fractionated or pre-processed in any other manner into a more stable composition than liquid gas produced by condensation of VOC. The high-compression Diesel engine according to the invention can be a four-stroke engine having, for example, a maximum speed of 700 rpm. Preferably the engine is a two-stroke crosshead engine having a cylinder bore of at least 200 mm, suitably at least 250 mm, and a speed of maximum 250 rpm. The engine may have a mean pressure of at least 16 bar and may be super-charged to at least 3 bar absolute at full load. The mean pressure may also be higher, such as 17 or 18 bar, and the supercharging may also be higher. As fuel the engine may also be supplied with compressed liquid gas with methane numbers as low as maximum 15, but may, of course, also use fuel of a higher methane number.

It may be appropriate to operate the high-compression engine by means of dual-fuel systems using liquid gas and fuel oil either separately or together. The oil may optionally be used as an ignition aiding pilot fuel.

The liquid gas is injected at a pressure higher than the pressure in the combustion chamber. The injection pressure usually ranges from 200 to 1200 bar, typically from 350 to 900 bar. At the injection the fuel is atomized into clouds of liquid droplets which evaporate immediately, whereupon a mixing takes place with the other gases in the combustion chamber. The injection of liquid gas occurs during one or more periods which may possibly start immediately before the piston reaches its top dead centre at the end of the compression stroke, for example from 6° CA before TDC, but otherwise occurs during the expansion stroke. The gas may combust when it has become suitably mixed with oxygen-containing air.

Each liquid injector 17 for injection of liquid gas is connected with the associated gas supply pipe 26 supplied from a suitable external gas source which may be of the above type on a crude oil carrier or may be connected to a permanent main line, if the engine is a stationary power generator. The pipe 26 passes the liquid gas to the liquid injector and is encapsulated by the mantle 47. The blower 49 maintains an airflow in the space between the inner surface of the mantle and the outer surface of the pipe. Preferably, the venting air has been preheated before being passed between the mantle and the pipe by means of freely available waste heat. This may be effected, for example, by heating the air in a heat exchanger with the coolant of the engine. The hot air can be supplied to the mantle in a counterflow with the inflowing gas. This may, for example, be effected by locating the air inlet near the engine, but this in turn may make it necessary with two blowers. The result of the heating is that no ice formations occur in or on the pipes in case of leaks and complete or partial venting of the gas to the atmosphere. At such a venting, the pressure will first be relieved to atmospheric pressure. Then the liquid gas will evaporate by bumpily boiling inside the pipes which are thus being cooled. The hot blower air counteracts a complete cooling down of the gas-carrying system. The gas-carrying pipes may also be emptied in a controlled manner without any substantial amounts of gas boiling in the pipes by the liquid gas being displaced by another fluid applied to the gas-carrying pipes at a suitable high pressure, for example fuel oil or a gas, such as inert gas.

If the engine is a ship's engine, the liquid gas may be stored in a pressurized and/or cooled tank.

Figure 5:
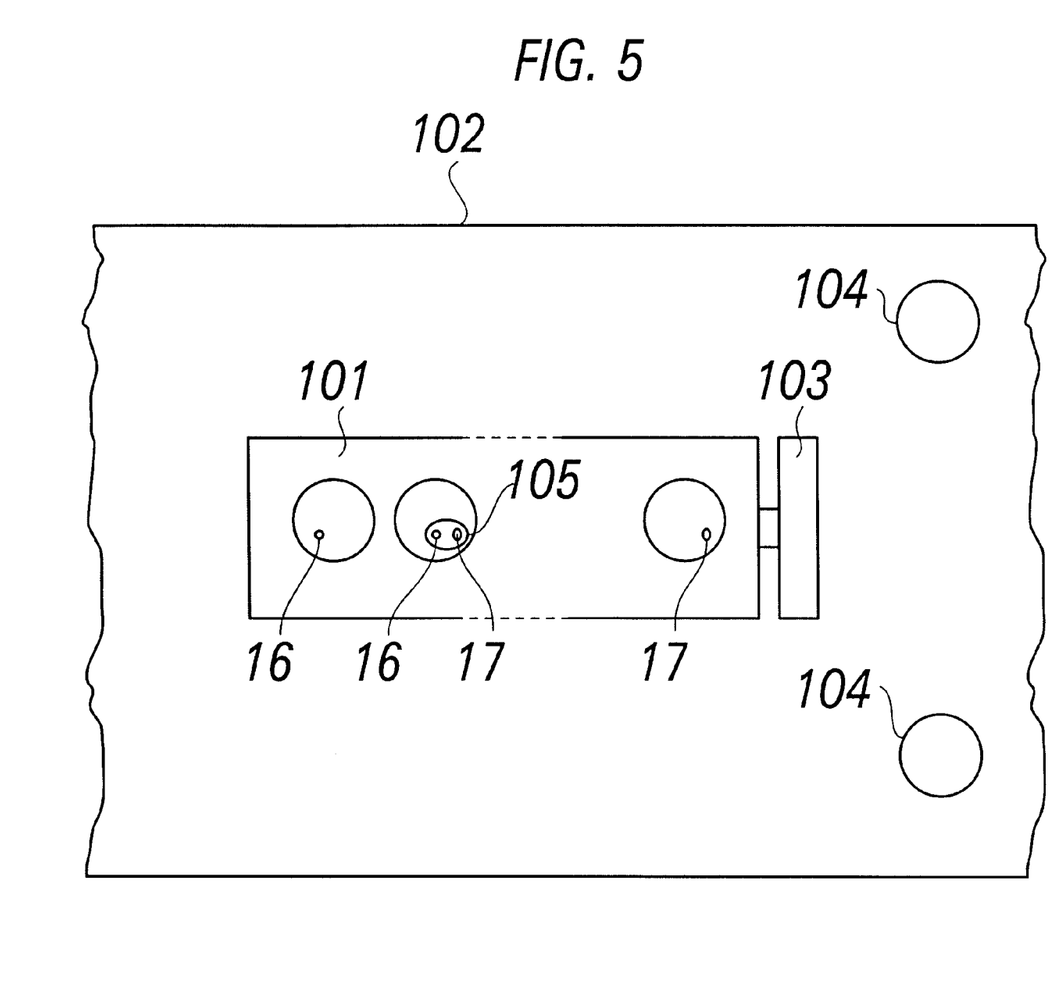
FIG. 5 is a diagram of an injection system of a ship.

With reference to FIG. 5, the liquid injectors 16 and the secondary injectors 17 are combined in a corresponding number of dual-fuel injectors 105. Also, according to a preferred embodiment, the engine is a main engine 101 of a ship 102 with crude oil tanks, and the volatile organic compounds of ignition properties, calorific values and evaporated amounts varying over time evaporated from these tanks constitute a substantial proportion of the fuel consumption of the main engine. The engine is connected to a shaft generator 103 in a shuttle tanker or ship 102 for collection of hydrocarbons from a drilling or production well. At least part of the Volatile Organic Compounds evaporated at the oil loading are combusted in the engine driving the shaft generator for power production for driving units 104 in a dynamic positioning system of the tanker or vessel.

What is claimed is:

1. An internal combustion engine of the Diesel type for combustion of compressed gas, comprising:

at least one tank from which volatile organic compounds evaporate;

a plurality of cylinders with combustion chambers;

an injection system with fuel injectors that inject fuel into the combustion chambers of the cylinders at a high pressure of at least 60 bar, wherein at least some of said fuel injectors are liquid injectors connected to at least one fuel feed pipe supplying said volatile organic compounds as compressed liquid gas to said at least one fuel feed pipe such that said liquid injectors inject said compressed liquid gas into said cylinders.

2. An internal combustion engine according to claim 1, wherein the injection system includes pilot injectors for injection of ignitable pilot fuel which initiates a combustion process on injection.

3. An internal combustion engine according to claim 1, wherein the injection system includes secondary injectors for high-pressure injection of gaseous mixtures which at least partially contain gas evaporated from said at least one tank as well as inert gas which has been filled into said at least one tank as a detonation-preventing gas.

4. An internal combustion engine according to claim 3, wherein a number of the liquid injectors and of the secondary injectors are combined in a corresponding number of dual-fuel injectors for injecting both the liquid gas and the gaseous gas-containing mixtures.

5. An internal combustion engine according to claim 3, wherein the injection system at intervals actuates the secondary injector(s) also when no gaseous fuel is to be injected into the associated cylinder(s).

6. An internal combustion engine according to claim 3, wherein only some of the engine cylinders are provided with said secondary injectors, while others of the cylinders are provided with liquid injectors, all the cylinders also optionally having one or more of pilot injectors and fuel oil injectors.

7. An internal combustion engine according to claim 1, wherein said engine is the main engine of a ship, such as a shuttle tanker or a crude oil carrier, and that said compressed liquid gas of volatile organic compounds constitutes a major proportion of the fuel said engine.

8. An internal combustion engine according to claim 7, wherein the fuel gas has-an inert gas content, the individual combustion chamber has a current cylinder pressure, the engine has an electronic control unit which, on the basis of monitoring of the current cylinder pressures, controls at least the injection pressure for the gaseous fuel gas so that the injection pressure is lower when the inert gas content of the gas is higher.

9. An internal combustion engine of the Diesel type for combustion of gas, comprising:

a plurality of cylinders with combustion chambers, that are supercharged to a pressure of at least 3 bar absolute at full load for the engine;

an injection system with fuel injectors that inject fuel into the combustion chamber of the cylinders, wherein at least some of said fuel injectors are liquid injectors connected to at least one fuel feel pipe;

means for supplying said at least one fuel feed pipe with liquid gas evaporated from a tank and compressed to a pressure of at least 200 bar;

wherein said liquid injectors inject said compressed liquid gas into said cylinders, and the engine maintains a volumetric compression ratio of at least 1:14 and a mean effective pressure of at least 15 bar.

10. An internal combustion engine according to claim 9, wherein the engine has a cylinder bore of at least 200 mm and a speed of at the most 700 rpm, suitably a cylinder bore of at least 250 mm, and a speed of at the most 250 rpm.

11. An internal combustion engine according to claim 10, wherein the engine is a two-stroke crosshead engine.

12. An internal combustion engine according to claim 9, wherein the compressed liquid gas has a methane number of maximum 15.

13. An internal combustion engine according to claim 9, wherein each liquid injector for injection of liquid gas is connected with a gas supply pipe which passes the liquid gas from an external gas source to the liquid injector and has an outer surface, the gas supply pipe is encapsulated by a mantle having an inner surface, a space is present between the inner surface of the mantle and the outer surface of the gas supply pipe, and a blower maintains an airflow of preheated blower air in said space.

14. A method of fuel supply of an internal combustion engine of the Diesel type, the engine having a plurality of engine cylinders and a fuel system, comprising the following steps:

supplying compressed volatile organic compounds evaporated from crude oil tanks to the fuel system of the engine said organic compounds varying over time; and injecting said compressed volatile organic compounds as liquid gas fuel into combustion chambers of said engine cylinders at a pressure of at least 60 bar.

15. A method according to claim 14, wherein the evaporated and compressed compounds comprise both a gaseous and a liquid phase being substantially separated from each other at the supply to the engine.

16. A method according to claim 15, wherein the gaseous phase includes an inert gas content, and the injection pressure of the gaseous phase is controlled so that the injection pressure is lowered when the inert gas content in the gaseous phase rises.

17. A method according to claim 15, wherein the compressed gaseous phase is supplied to the fuel system of the engine at a temperature, and the gaseous phase in the fuel and injection system of the engine is maintained at a higher temperature than said temperature at which it was supplied.

18. A method according to claim 17, wherein the temperature of the gaseous phase in the fuel system is controlled so as to rise towards the engine.

19. A method according to claim 15, wherein said liquid and said gaseous phases are both supplied to all the engine cylinders.

20. A method according to claim 15, wherein said liquid phase is supplied to some of the engine cylinders while said gaseous phase is supplied to others of the engine cylinders.

21. A method according to claim 14, wherein the engine is a main engine of a ship with crude oil tanks from which evaporation of said Volatile Organic Components occurs, and wherein the engine is only supplied with fuel oil to the extent required as ignition aid or required because the current fuel requirement of engine exceeds the supply of fuel gas to the engine.

22. A method according to claim 14, wherein the engine drives a shaft generator in a shuttle tanker or in a vessel for collection of hydrocarbons from a drilling or production well, volatile organic compounds evaporate during loading said hydrocarbons into said tanker or vessel; and that said engine combusts at least part of said volatile organic compounds while said engine drives the shaft generator for power production for driving units in a dynamic positioning system of the tanker or vessel.

* * * * *